Feb. 16, 1954  J. C. HOBBS  2,669,413
STOP-CHECK VALVE

Filed Feb. 9, 1951  2 Sheets-Sheet 1

INVENTOR.
JAMES C. HOBBS
BY
Richey & Watts
ATTORNEYS

Feb. 16, 1954   J. C. HOBBS   2,669,413
STOP-CHECK VALVE
Filed Feb. 9, 1951   2 Sheets-Sheet 2
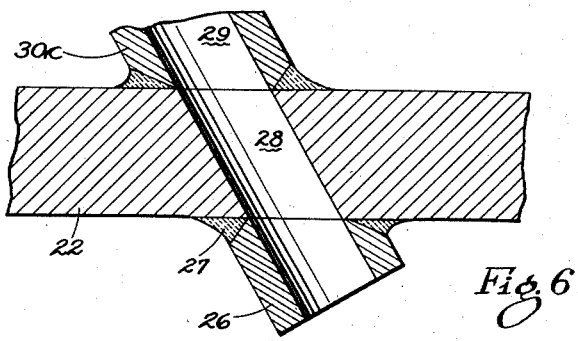
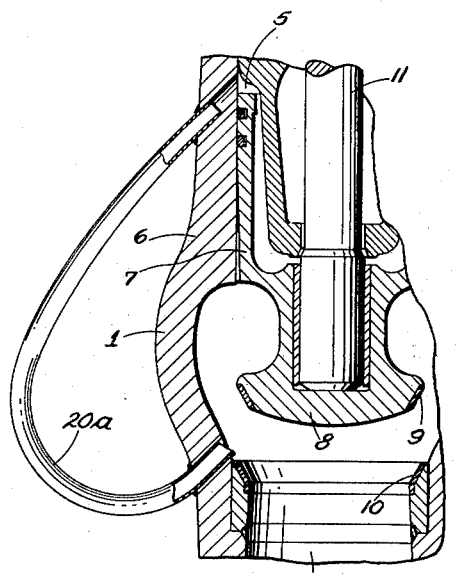
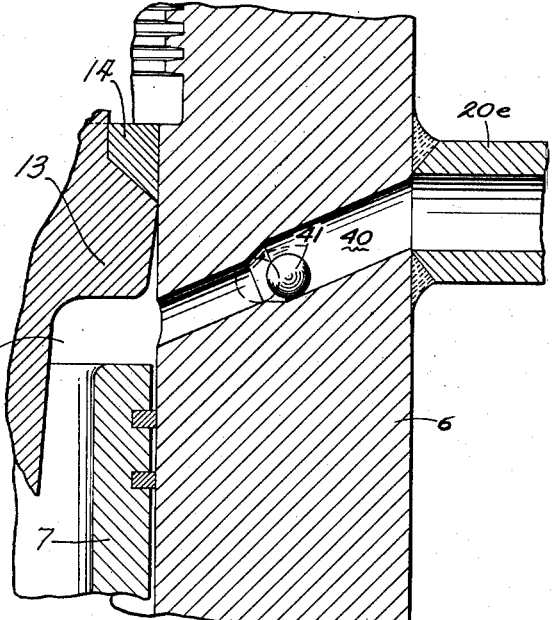
INVENTOR.
JAMES C. HOBBS
BY
Richey & Watts
ATTORNEYS Patented Feb. 16, 1954

2,669,413

UNITED STATES PATENT OFFICE 2,669,413

STOP-CHECK VALVE

James C. Hobbs, Coral Gables, Fla.

Application February 9, 1951, Serial No. 210,156

3 Claims. (Cl. 251—2)

This invention relates generally to fluid pressure valves and is particularly concerned with new stop-check valves in which the pressure drop and the velocity of the fluid flow in the valve body are utilized to facilitate the opening of the valve and to prevent undesirable reciprocation of the valve.

Stop-check valves, as constructed prior to my invention, have possessed several undesirable characteristics. Where the valve was operatively associated with a piston and fluid pressure could enter the chamber back of the piston, the valve could be opened only with the expenditure of considerable manually or mechanically applied force and then, usually, only to a limited extent due to fluid pressure in the chamber back of the valve. Moreover, such valves had a tendency to float or move between fully open position and positions close to its seat and, under certain conditions, to hammer the valve seat. Where such hammering action was persistent or forceful, the sealing surfaces on the valve or valve seat, or both, were quickly deformed to such an extent that they would no longer seal against flow of fluid through the valve body when the valve was closed.

Even when the valves did not hammer the valve seat, they had undesirable reciprocating motion of the piston in the valve body which caused excessive wear on the parts and resulted in outage and expensive maintenance for several reasons. The elevated temperatures of piston, piston rings and cylinder wall of valve body prevented the use of known lubricants. The absence of lubrication decreased the sealing effect of the piston rings and also required somewhat lower spring loading of the piston ring against the cylinder wall. These two conditions permitted more leakage of fluid to the back of the piston which had to be removed to prevent equalizing of pressure on both sides of the piston.

It is also desirable to have the valve close gently, particularly when the differential pressure through the valve is smaller than is desired. It is also desirable that, at low differential pressure, the valve should open quickly, and to its full extent, and that it should not "float" while off its seat or "hammer" the seat.

The present invention aims to avoid the foregoing and other well-known defects, shortcomings and disadvantages of the prior types of valves and attains this objective by a new combination of parts which utilizes the differential pressure and velocity of the fluid to bring about expeditious opening of the valve to substantially its fullest extent and to maintain it in fully open position during such pronounced changes in differential pressure as would have resulted in intolerable hammering in conventional valves of the prior art.

Briefly stated, the present invention comprises the combination of a stop-check valve with a conduit which connects the zone of fluid in the chamber in the valve body back of the valve piston with another zone of the fluid, within or outside of the valve body, and in such a manner that fluid flowing therepast will produce an aspiration or suction action in the conduit. This action may take place when the fluid pressure is lower at the discharge end of the conduit than at the piston and the velocity of fluid flow therepast is low, or when the pressure differential is low and the velocity is high, or when both the pressure differential and velocity are high.

This action is brought about by properly locating and/or shaping the discharge end of the conduit. In general that end should discharge fluid into the flowing stream of fluid and that stream should not flow into the conduit. These conditions may be attained by inclining the conduit discharge at an acute angle to the stream in the direction of flow or by imposing an obstruction in the path of flowing fluid up stream relative to the conduit discharge end.

The present invention will be better understood by those skilled in the art from the following specification and the drawings attached to and forming a part thereof, in which:

Figs. 2, 3, 4, 5 and 6 are fragmentary, cross-sectional views showing modifications of the conduit means of Fig. 1;

Fig. 7 is a fragmentary view similar to Fig. 1 but showing a modified form of conduit connection; and Fig. 8 is a fragmentary, sectional view of another modified form of conduit including a check.

Figure 1:
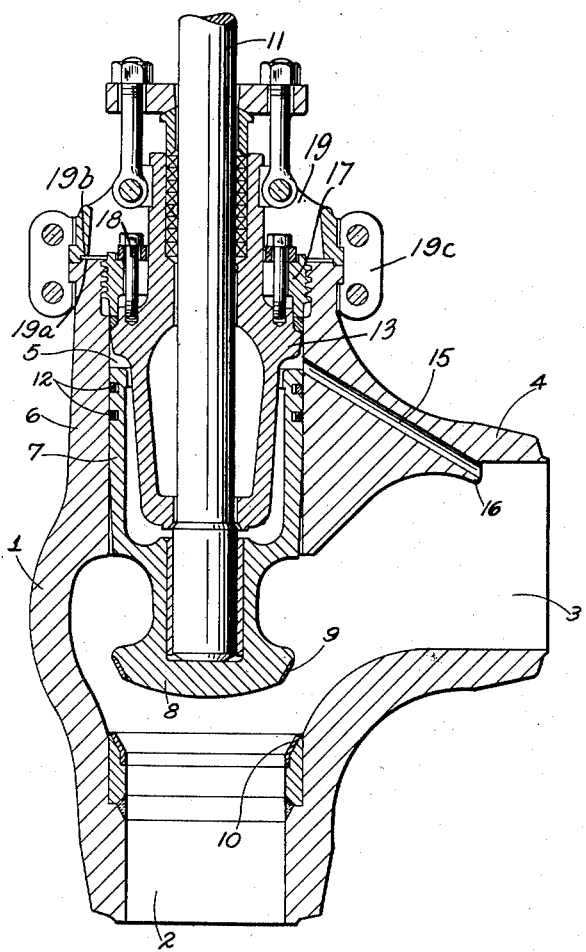
Fig. 1 is a fragmentary, central, sectional view through a stop-check valve embodying the present invention.

In Fig. 1 the valve comprises a body 1 having an inlet passage 2, an outlet passage 3 defined by wall 4 and a combined valve-receiving opening and piston chamber 5 defined by wall 6 and in which a piston 7 is movable endwise. At its inner end piston 7 is integrally connected to a valve 8 having an annular surface 9 to bear against valve seat 10 at the inner end of inlet passage 2.

Piston 7 has a loose fit on stem 11 and is movable in chamber 5 by the stem and any suitable valve operating mechanism (not shown) connected thereto so as to move the valve 8 into engagement with seat 10. If the valve stem and its actuating mechanism are omitted then piston 7 will be representative of the dashpot type.

Piston rings 12 may be used on piston 7 to effect somewhat better sealing between piston 7 and wall 6. The piston 7 and rings 12 do not fit the walls of the piston chamber tightly enough to prevent flow of fluid under pressure into the part of the chamber back, or outside, of the piston and, hence, when the valve is open, fluid under pressure may pass into this back part of chamber 5.

Fig. 1 shows conduit means connecting the part of the piston chamber back of the piston with the outlet passage 3. The conduit means includes a fluid passage 15 which extends from chamber 5 back of piston 7 through walls 6 and 4 of the body and opens into outlet passage 3 on the downstream side of projection 16 which extends into passage 3. Passages 15 and 3 intersect at an acute angle in the direction of fluid flow and by reason thereof and the projection 16 fluid flow out through passage 3 does not enter conduit 15 but does induce a flow of fluid therethrough from chamber 5. Thus the velocity increase due to the obstruction and the difference in pressure between that at the valve and that at the discharge end of conduit 15 cause a flow of fluid out of chamber 5.

A bonnet 13 extends into and closes the valve-receiving opening 5. A gasket 14, triangular in cross-section, bears against an outer annular surface of bonnet 13 and against the adjacent wall defining opening 5 and, at its outer end, is engaged by ring 17 which is threaded into the body adjacent to the outer end of opening 5. Bolts 18 attached to bonnet 13 and operatively associated with ring 17 serve to move the bonnet 13 outwardly and thereby to press gasket 14 against ring 17 and against the wall of opening 5 to effect initial sealing contact of ring 14 with the surfaces of the bonnet 13 and the valve body.

It will be noted that the piston 7 is provided with axially spaced guides, one of these guides including the outer end of the piston and the piston rings 12 and the other being its engagement with the inner end of stem 11. It will also be noted that the bonnet provides two axially spaced portions lying close to stem 11, one near the inner end of the bonnet 13 and the other near the outer end of opening 5, which portions may, under certain conditions, serve as guides or bearings for the stem. It will further be noted that in its valve open position, piston 7 does not close the inlet end of conduit 15.

The yoke 19 which carries the stem actuating means (not shown) seats directly on the body 1 around the outer end of opening 5 where, as will be noted, the yoke is centrally located by an annular shoulder 19a on the body which seats in an annularly shouldered recess 19b in the yoke. The yoke 19 is retained in position on the body by the multipart clamping ring 19c. This ring and the shoulder 19a and recess 19b prevent lateral and tilting movement of the yoke relative to the body and, hence, prevent the application of excessive bending forces to stem 11. Since the piston is effectively guided and the stem is not subjected to bending forces which would materially impede its longitudinal movement, the stem and piston are both readily movable.

When piston 7 is moved to permit the flow of fluid under pressure through inlet passage 2 and out through outlet passage 3 some of the fluid collects in piston chamber 5 back of the piston; also fluid will have accumulated therein when the valve was closed. In either event, however, any fluid under pressure in this back part of the chamber will be caused to flow through passage 15 into outlet 3 when fluid flows from inlet 2 through outlet 3. The pressure differential between the valve seat and the zone at the discharge end of passage 15 and the velocity of the fluid flowing through past that discharge end exert an aspirating effect through passage 15 to the back part of piston chamber 5 and reduce the pressure of fluid therein with attendant decrease in resistance offered thereby to valve opening movement of the piston. When the valve is of the dashpot type, this aspirating effect greatly facilitates the opening of the valve and causes the valve to move to, and remain in, substantially fully open position.

Figure 2:
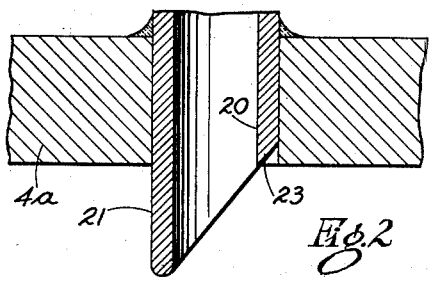

Fig. 2 shows a tube 20 which extends, at one end, through the valve body wall 4a, defining outlet passage 3 and, at its other end (not shown), through wall 6 into the back end of chamber 5. In this instance, the inner end of tube 20 is cut off on the bias so that the part 21 opposed to the direction of flow of fluid through passage 3 extends in some little distance beyond the inner surface of wall 4a and the down stream side 23 of the tube and the fluid flow therein intersects the flow in passage 3 at a very small acute angle. This part 21 constitutes an obstruction to the flow of fluid in passage 3 thereby increasing its rate of flow at that place in the passage and also deflecting the flow so that it does not enter conduit 20. In this modification, the operation is quite like that above described in connection with Fig. 1. Due to the shape and position of the discharge end of tube 20, the differences in pressure on the up stream and down stream sides of that end of the tube and the velocity of the fluid therepast, an aspirating effect will be exerted through tube 20 on the back part of piston chamber 5.

Figure 3:
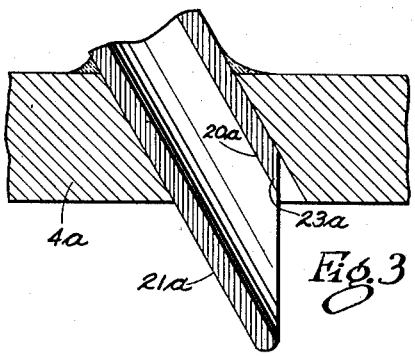

In Fig. 3 the conduit 20a is quite like conduit 20 shown in Fig. 2 in its shape and connection to the valve body but, due to the fact that it extends into passage 3 at an acute angle and has a bias cut end, its up stream side 21a projects farther into the stream of fluid in passage 3 than does the up stream side of tube 20 and the two streams intersect at a smaller acute angle. The operation of this modification is substantially like that of the modifications shown in Figs. 1 and 2 for the differential pressure and velocity of the fluid flowing through the outlet 3 causes an aspirating effect or suction to be exerted through tube 20a on the back part of chamber 5.

Figure 4:
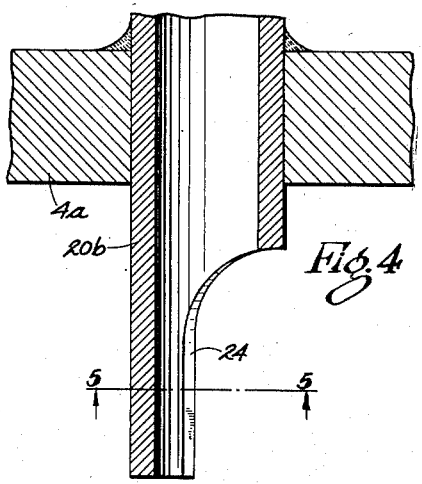
Figure 5:
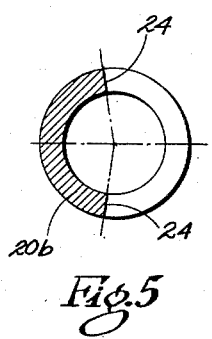

In Figs. 4 and 5 the conduit 20b resembles conduit 20 of Fig. 2 but extends still farther into passage 3 and its down stream side is cut away longitudinally, as indicated at 24 leaving a wall of substantially 80° on each side of a plane extending longitudinally of the stream of fluid through the center thereof as is indicated in Fig. 5. However, conduit 20b with its shorter down stream side is quite like conduits 15, 20 and 20a of Figs. 1, 2 and 3, respectively, in operation and results and differs from conduit 15 and resembles the conduits of Figs. 2 and 3 in structure in that it is a tube which extends through the walls of the valve body defining the outlet passage and the piston chamber.

Fig. 6 shows a modification which combines features of Fig. 2 on the one hand and Figs. 2, 3 and 4 on the other hand. In this modification, a short tubular obstruction 26 is disposed at an acute angle to the inner surface of wall 4a defining the outlet passage 3 and is secured to that wall as by weld metal 27. This tube 26 communicates with a passage 28 extending through wall 4a and with passage 29 through a conduit 20c which is welded to the outside of wall 4a around passage 3 and at its other end communicates with the interior of piston chamber 5 through wall 6. The inner end of tube 26 may be at right angles to its longitudinal axis as shown or may be cut after the fashion shown in Figs. 2, 3 and 4 or in any other equivalent manner, the essential thing being that the upstream side of tube 26 should extend farther into the outlet passage than the down stream side so as to result in the above described aspirating or suction effect.

A valve equipped with the apparatus of Fig. 6 operates substantially the same as that described in connection with the apparatus of Figs. 1 to 5 inclusive.

In Fig. 7 the space back of the piston is connected by conduit 20d to the interior of the valve body 1 adjacent to valve seat 10. The discharge end of this conduit extends through valve body wall at such an angle that fluid flow therepast will create a vacuum or suction action in the conduit as described in connection with Figs. 1 to 6.

In Fig. 8 the opening 40 in valve body 6, which connects with conduit 30e leading to a stream of fluid flowing from a valve, is provided with a ball valve 41 which acts as a check valve. It permits a large volume flow of fluid out of chamber 5 back of the piston into conduit 20e and a very small volume leakage of fluid in the opposite direction. This check valve arrangement assures a gently closing valve. It is especially useful with high temperature fluid where the piston rings quickly lose their spring properties. It may be used with pistons having no rings for it permits the use of large suction conduits for quick removal of fluid from behind the piston and yet prevents quick closing of the valve and reverse flow of fluid in the conduit. It is to be understood that according to this invention the discharge end of the conduit leading from the chamber back of the piston may open into the outlet passage of the valve body, as shown in Fig. 1 or closely adjacent to the inlet passage as shown in Fig. 7 and may even lead into a pipe, communicating with the outlet passage at quite some distance from the valve. The important factors are that the discharge end of the conduit should open into a zone where a differential pressure exists or the fluid flow has considerable velocity or where both differential pressure and velocity exist. In other words, that discharge end should be in a zone where the pressure is lower than it is up stream therefrom, or where the velocity is high, or where there is considerable velocity of fluid flow in such a low pressure zone. The aspirating effect is increased without decrease in pressure by projections or obstructions in the fluid flow passage at the discharge end of the conduit from the back end of the piston chamber, and may be increased by other ribs or velocity increasing projections but such ribs and projections should be adjacent to the discharge end of the conduit for if located elsewhere they may cause turbulence with resultant decrease in aspirating effect.

Opening of the valve takes place when the fluid back of the piston is withdrawn and at a rate corresponding to the rate of such withdrawal. The valve is opened full due to substantially complete removal of fluid from behind it and fluid pressure exerted on the other side of the valve. "Floating" and "hammering" of the valve are prevented by the wide difference in pressures on opposite sides of the valve and piston. Closing of the valve takes place gently because it occurs only as the pressure builds up back of the piston until it equals the pressure on the other side thereof minus the weight of the valve.

The conduits above described should be ample in size to obtain the above stated objectives when there are very small differences in pressure or velocity or both in the stream of flowing fluid.

Having thus described the present invention so that others skilled in the art may be able to understand and practice the same, I state that what I desire to secure by Letters Patent is defined in what is claimed.

What is claimed is:

1. A valve for high pressure fluid comprising a body defining inlet and outlet passages for such fluid and a combined valve-receiving opening and piston chamber, means for closing said opening against escape of such fluid including a bonnet in said opening, a valve seat in said inlet passage, a piston reciprocable in said piston chamber between the valve seat and bonnet and having guiding engagement with the walls of said chamber, a valve movable with said piston, a valve stem engageable with said piston and extending out through said bonnet, and means operative throughout the time high pressure fluid is flowing through said inlet opening continuously to remove from said outer end of the piston chamber fluid which has leaked thereinto past the piston, said means including a constantly open pipe having an inlet end communicating with the outer end of said piston chamber and having an outlet end extending into the stream of high pressure fluid flowing from said inlet passage, said outlet end having at its upstream side an obstruction to said stream and having in its downstream side an opening to discharge fluid withdrawn from said piston chamber, said obstruction comprising a wall of said pipe extending at least 80° on each side of a plane extending through the center line of said pipe and longitudinally of said stream of high pressure fluid.

2. A valve for high pressure fluid comprising a body defining inlet and outlet passages for such fluid and a combined valve-receiving opening and piston chamber, means for closing said opening against escape of such fluid including a bonnet in said opening, a valve seat in said inlet passage, a piston reciprocable in said piston chamber between the valve seat and bonnet and having guiding engagement with the walls of said chamber, a valve movable with said piston, a valve stem engageable with said piston and extending out through said bonnet, and means operative throughout the time high pressure fluid is flowing through said inlet opening continuously to remove from said outer end of the piston chamber fluid which has leaked thereinto past the piston, said means including a constantly open pipe disposed outside of said body with its inlet end communicating with the outer end of said piston chamber and its outlet end extending through the body and into the outlet passage at an acute angle to a stream of high pressure fluid flowing therein, said outlet end having at its upstream side an obstruction to said stream and being open on its downstream side on a plane at substantially right angles to said stream.

3. A valve for high pressure fluid comprising a body defining inlet and outlet passages for such fluid and a combined valve-receiving opening and piston chamber, means for closing said opening against escape of fluid including a bonnet in said opening, a valve seat in said inlet passage, a piston reciprocable in said piston chamber between the valve seat and bonnet and having guiding engagement with the walls of said chamber, a valve movable with said piston, a valve stem engageable with said piston and extending out through said bonnet, and means operative throughout the time high pressure fluid is flowing through said inlet opening continuously to remove from said outer end of the piston chamber fluid which has leaked thereinto past the piston, said means including a constantly open pipe having an inlet end communicating with the outer end of said piston chamber and an outlet end projecting into the stream of high pressure fluid flowing from said inlet passage, the downstream side of said outlet end being cut away on an acute angle to the longitudinal center line of the pipe to afford an opening to discharge fluid withdrawn from said piston chamber, and the upstream side of said outlet end constituting an obstruction deflecting the flow of said stream of fluid away from the opening in said outlet end.

JAMES C. HOBBS.

References Cited in the file of this patent

UNITED STATES PATENTS

| Number | Name | Date |
|---|---|---|
| 313,180 | Colwell | Mar. 3, 1885 |
| 760,595 | Wisebrock | May 24, 1904 |
| 772,287 | McCarl | Oct. 11, 1904 |
| 1,198,120 | Gill | Sept. 12, 1916 |
| 1,359,988 | Hansen | Nov. 23, 1920 |
| 1,751,046 | Martin | Mar. 18, 1930 |
| 1,791,980 | Shea | Feb. 10, 1931 |
| 1,981,576 | Wolfenden | Nov. 20, 1934 |
| 2,223,699 | Norgren | Dec. 3, 1940 |
| 2,227,578 | Fraser | Jan. 7, 1941 |
| 2,504,470 | Trautman | Apr. 18, 1950 |
| 2,621,015 | MacGregor | Dec. 9, 1952 |
| 2,621,016 | MacGregor | Dec. 9, 1952 |

FOREIGN PATENTS

| Number | Country | Date |
|---|---|---|
| 3,140 | Great Britain | of 1868 |
| 13,596 | Great Britain | of 1886 |
| 126,035 | Switzerland | of 1928 |
| 345,530 | Great Britain | of 1941 |